US008949669B1

(12) United States Patent
Khokhar et al.

(10) Patent No.: US 8,949,669 B1
(45) Date of Patent: Feb. 3, 2015

(54) ERROR DETECTION, CORRECTION AND TRIAGE OF A STORAGE ARRAY ERRORS

(75) Inventors: Muzhar S. Khokhar, Shrewsbury, MA (US); Michael P. Thibault, Bellingham, MA (US)

(73) Assignee: EMC Corporation, Hopkinton, MA (US)

(*) Notice: Subject to any disclaimer, the term of this patent is extended or adjusted under 35 U.S.C. 154(b) by 182 days.

(21) Appl. No.: 13/616,741

(22) Filed: Sep. 14, 2012

(51) Int. Cl.
*G06F 11/00* (2006.01)

(52) U.S. Cl.
USPC .............................................. 714/26; 714/48

(58) Field of Classification Search
CPC ............ G06F 11/0727; G06F 11/0766; G06F 11/0781; G06F 11/079; G06F 11/0793
USPC ..................................................... 714/26, 48
See application file for complete search history.

(56) References Cited

U.S. PATENT DOCUMENTS

| 6,708,291 | B1 * | 3/2004 | Kidder | 714/39 |
| 8,166,351 | B2 * | 4/2012 | Slutsman et al. | 714/48 |
| 2003/0126501 | A1 * | 7/2003 | Musman | 714/26 |
| 2003/0149919 | A1 * | 8/2003 | Greenwald et al. | 714/43 |
| 2004/0059966 | A1 * | 3/2004 | Chan et al. | 714/48 |
| 2004/0153819 | A1 * | 8/2004 | Bjorsne et al. | 714/37 |
| 2006/0004830 | A1 * | 1/2006 | Lora et al. | 707/102 |
| 2006/0085689 | A1 * | 4/2006 | Bjorsne | 714/39 |
| 2008/0244585 | A1 * | 10/2008 | Candea et al. | 718/102 |
| 2009/0204845 | A1 * | 8/2009 | Herscovitz et al. | 714/2 |
| 2010/0174949 | A1 * | 7/2010 | Athey et al. | 714/39 |
| 2010/0192005 | A1 * | 7/2010 | Das et al. | 714/2 |
| 2011/0239050 | A1 * | 9/2011 | Malisetti et al. | 714/37 |
| 2012/0102359 | A1 * | 4/2012 | Hooks | 714/26 |
| 2013/0013967 | A1 * | 1/2013 | Gokhale et al. | 714/57 |
| 2013/0212440 | A1 * | 8/2013 | Rom et al. | 714/47.1 |
| 2013/0227352 | A1 * | 8/2013 | Kumarasamy et al. | 714/47.1 |
| 2013/0283087 | A1 * | 10/2013 | Behrendt et al. | 714/2 |
| 2014/0006862 | A1 * | 1/2014 | Jain et al. | 714/26 |

* cited by examiner

*Primary Examiner* — Marc Duncan
(74) *Attorney, Agent, or Firm* — BainwoodHuang

(57) ABSTRACT

The system and method filters out benign errors and triaging errors that are not filtered. The errors that are not filtered are triaged by categorizing the error and in response to the categorized error either resolving the error by executing code to proactively test the error and repair it; or collect the data necessary to perform deeper analysis by the customer service center and forwarding the collected data to the customer service center.

12 Claims, 4 Drawing Sheets

ERROR DETECTION, CORRECTION AND TRIAGE OF A STORAGE ARRAY ERRORS

BACKGROUND

A conventional storage array provides disk storage and storage processors allowing access by one or more external host computers. The conventional storage array provides duplicate paths providing access to logical units on the array of disk drives. The conventional storage array also includes cache memory, memory, network connections, power supplies and battery backup power.

The storage array when processing logical block requests or responding to internal or external health checks can produce an error in the I/O path or hardware components that are embodied therein. The storage array upon detecting the error will inform a customer service organization responsible for the storage array by automatically establishing a transmission link (i.e. dialing home) to report the error. It would be understood that in modern systems establishing a transmission link also refers to reports made via a network such as the internet.

In parallel to reporting the error to the customer service organization the storage array also begins to collect state information required to analyze the error by the customer service organization. The storage array collects the data into a multi mega-byte file and, when complete, either forwards the file to the customer service organization or allows the customer service organization to retrieve the file when responding to the automatically established transmission link.

The customer service organization upon receiving the collected error information from the storage array initially checks the type of errors. Some errors such as benign status errors or a single parity error are ignored. Errors indicating the failure of a field replaceable unit such as a disc drive are handled by dispatching a field replaceable unit to the client site where an administrator at the site can replace the failed unit.

More complex errors require a first level customer service representative to analyze information collected by the storage array. The first level customer service representative runs software to analyze the multi mega-byte file containing information from the storage array and further analyzes the errors to known error database and uses professional knowledge built up over time to diagnose and repair errors in the storage array.

SUMMARY

Unfortunately, there are deficiencies with the above-described conventional storage array and customer service organization reporting, diagnosing and testing errors in a storage array. Not all errors are of the same importance nor require that a customer service organization be informed. For example, a simple one time parity error is of little consequence to the system administrator of the storage array or the customer service center. Automatically establishing a transmission link to report such an error forces the customer service center to analyze a low priority error, spending time and resources to make a decision about the error and clogging a queue of received errors, preventing higher priority errors from being addressed. Additionally, the collection of data on the storage array takes time and reduces system throughput while logs are copied and saved for distribution to the customer service center.

In contrast to the above described storage array, an improved technique provides a storage array that filters and triages the errors internally. The technique provides for filtering out benign errors and triaging errors that are not filtered. Errors that are not filtered are triaged by categorizing the error and in response to the categorized error either resolving the error by executing code to proactively test the error and repair it; or collect the data necessary to perform deeper analysis by the customer service center and forwarding the collected data to the customer service center.

Advantageously, the improved technique provides for filtering of the errors preventing low priority errors from causing a management station from automatically establishing a transmission link, reducing the queue of received errors at a customer service center and the management station's resources used to automatically establish a transmission link. The technique further reduces the time necessary to respond to an error and test the error where the error is of a know type is tested by software developed to test such errors at the storage array, thereby preventing the need to collect the data and forward it to the customer service center as well as have the data transmitted from the storage array to the customer service center.

One method provides a system of processing detected errors in a storage array where a storage array filters errors when the error is found in a set of errors to be filtered. When the error is not in the set of errors to be filtered the storage array forwards the error to the customer service center. In parallel, a management station categorizes the error and in response to the categorized error, a triage circuit performs at least one of (1) test the error via operation of a test circuit, (2) repair the error, and (3) mark the error for remote processing by a customer service site. Based on the prioritization of the error, the management station further gathers relevant information from log files of the storage array, the relevant information being information used only to diagnose a root cause of the error and then transmits the error and the relevant information to a remote customer service site.

One embodiment of the improved technique is directed to a method for processing detected errors in a storage array. The management station receives an error created within the storage array. The management station then compares the error to a set of errors, preventing further processing of the error upon the error being found in the set of errors. Upon the error not being in the set of set of errors the management station performs triage by the categorization of the error and in response to the categorization of the error, performs at least one of: testing the functionality that caused the error; and marking the error for remote processing. When the triage is complete, the management station then gathers relevant information from log files, the relevant information being information used only to diagnose a root cause of the error. The management station transmits the relevant information to a remote customer service site.

Another embodiment of the invention is directed to computer program product stored on a non-transitory computer readable storage medium that upon execution by a computer processor performs the method of processing detected errors in a storage array.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being

DETAILED DESCRIPTION

An improved technique provides a storage array that filters and triages errors internally. The technique provides for filtering out errors and triaging errors that are not filtered. Errors that are not filtered are triaged by categorizing the error and in response to the categorized error either resolving the error by executing code to proactively test the error and/or collect the data necessary to perform deeper analysis by the customer service center and forwarding the collected data to the customer service center.

Figure 1:
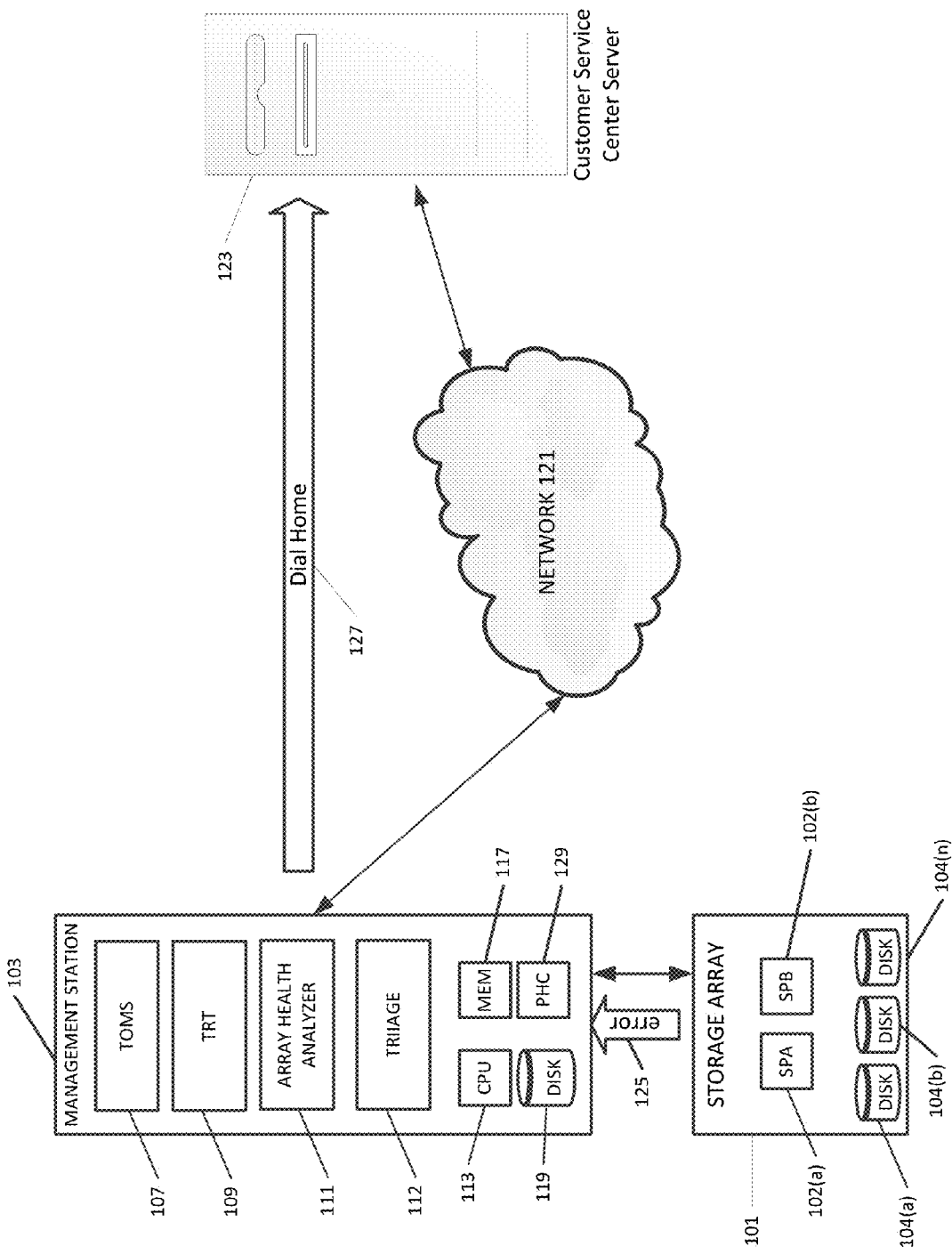
FIG. 1 is a schematic diagram illustrating an example system for authentication.

FIG. 1 is a schematic diagram illustrating a storage array of the improved technique. The example storage array 101 includes storage processors 102(a) and (b) with an array of disk drives 104(a)-(n) and an array health analyzer. The example storage array 101 also includes a management station 103 for controlling the processing of errors in the storage array 101. The management station 103 further includes a triage real-time module (TRT) 109, and triage on management station module (TOMS) 107, executed by a CPU 113 loaded into memory 117 from the disk 119 where the modules are permanently stored in a non-transitory manner. It would be understood that other types of non-transitory computer readable storage media other than the disk 119 could be used such as a DVD, CD-ROM, flash memory and the like. It is also understood that upon execution of the modules by the CPU a circuit is created.

The example system also includes a network 121 providing connectivity between the management station 103 and customer service server 123. The customer service server 123 is connected to the network to allow the receipt of errors from the management station 103 and allow first level customer support personnel to diagnose and repair errors on the storage array 101.

It is also understood that while the management station 103 is shown separately from the storage array 101, the management station 103 could also be configured internally to the storage array 101.

The storage array 101 produces an error in response to a file system request, state change in equipment of the storage array 101 or in response to a health check inquiry. The error 125 is first caught by the management station 103. Within the management station the array health analyzer module 111 catches the error 125. It will be understood that errors have error codes assigned to them and that the array health analyzer module 111 will compare the error code of the error 125 to a known set of errors. The error code will fall into several categories used to process errors. For example, benign errors are errors that can all be discarded. A higher severity set of errors exists where only the first error of the higher severity type of error need to be processed for a given time period or predetermined number of errors. Further errors of this type can be ignored. The array health analyzer module 111 can either generate a transmission link for these errors when a threshold is exceeded or if the errors that automatically establish a transmission link 127 have already occurred for these errors, and then throttle back the reporting of these errors for a given time period. In the event that messages are throttled back, the customer service center server 123 will reset the counters and allow new errors to be processed upon testing the underlying cause of the error 125.

The array health analyzer module 111 further filters the error 125 when the timestamp of the error 125 is older than forty eight hours. The array health analyzer module 111 further filters errors based upon the group to which the errors belong. Much like the throttling of an individual error 125 above when it exceeds a predetermined number of errors, the same throttling applies to a group of like errors.

The array health analyzer module 111 further filters the error 125 based upon the severity of the error. For example, one critical error could be allowed for processing every twelve hours; one normal error could be processed every twelve hours and one warning error processed every twenty-four hours. When the number of errors exceeds the predetermined number in the predetermined time frame for each severity, then follow on errors of the same severity can be ignored.

When the error 125 is not filtered, the array health analyzer module 111 forwards the error 125 to triage real-time module 109 for further processing. The triage real-time module 109 is made up of a set of scripts for diagnosing and addressing errors in the storage array 101. The array health analyzer module 111 limits the amount of time the triage real-time module 109 can run to a predetermined time, for example, five minutes. Limiting the time prevents the triage real-time module 109 from stalling while the storage array 101 forwards an increasing number of errors.

The triage real-time module 109 runs scripts that check on the underlying error 125. When the scripts are run and pass, either because the error was transient or the error script resolves the error, no further processing is required for error resolution. The triage real-time module 109 creates a document in extensible mark-up language (XML) indicating the result status of the script. For example, in the case the error 125 indicated a coherency error on a drive of the storage array, a script "Coherency Check" is run naming the drive producing the error as the target. The result of the test was positive and therefore the test passed. An XML document as follows indicates the state and resolution of the error 125.

```
<?xml version="1.0" encoding="UTF-8"?>
  <result>
    <metadata>
    <TriageIssuesVersion>v2.0.0</TriageIssuesVersion>
    <CreationDate>15-Jun-12 14:31:19</CreationDate>
    </metadata>
    <tests>
    <test name="Coherency Check">
    <result>PASSED</result>
    </test>
    </tests>
  </result>
```

The XML document produced by the triage real-time module 109 is archived, in for example disk 119, to reflect the error 125 occurred and that the error was resolved.

The triage real-time module 109 can also conclude that the script "Coherency Check" failed. Upon the determination by the triage real-time module 109 a XML document 313 is produced indicating that the script has failed. The XML document 313 will further be amended to include information about the failure. The XML document 313 will be archived and the array health analyzer module 111 informed of the failure and existence of the XML document. The array health analyzer module 111 will forward the XML document to customer service center server 123 that sets an indicator to automatically establish a transmission link 127. It would be understood that the automatically establishing a transmission link 127 is established across the network 121 from the management station 103 to the customer service center 123. Alternatively, a standard phone line with modem could be used to transmit the XML document 313.

The array health analyzer module 111 upon receipt of the indicator that the scripts of the triage real-time module 109 having failed or having to kill the triage real-time module 109 for exceeding its predetermined time for execution causes the triage on management station module 107 to execute.

Figure 2:
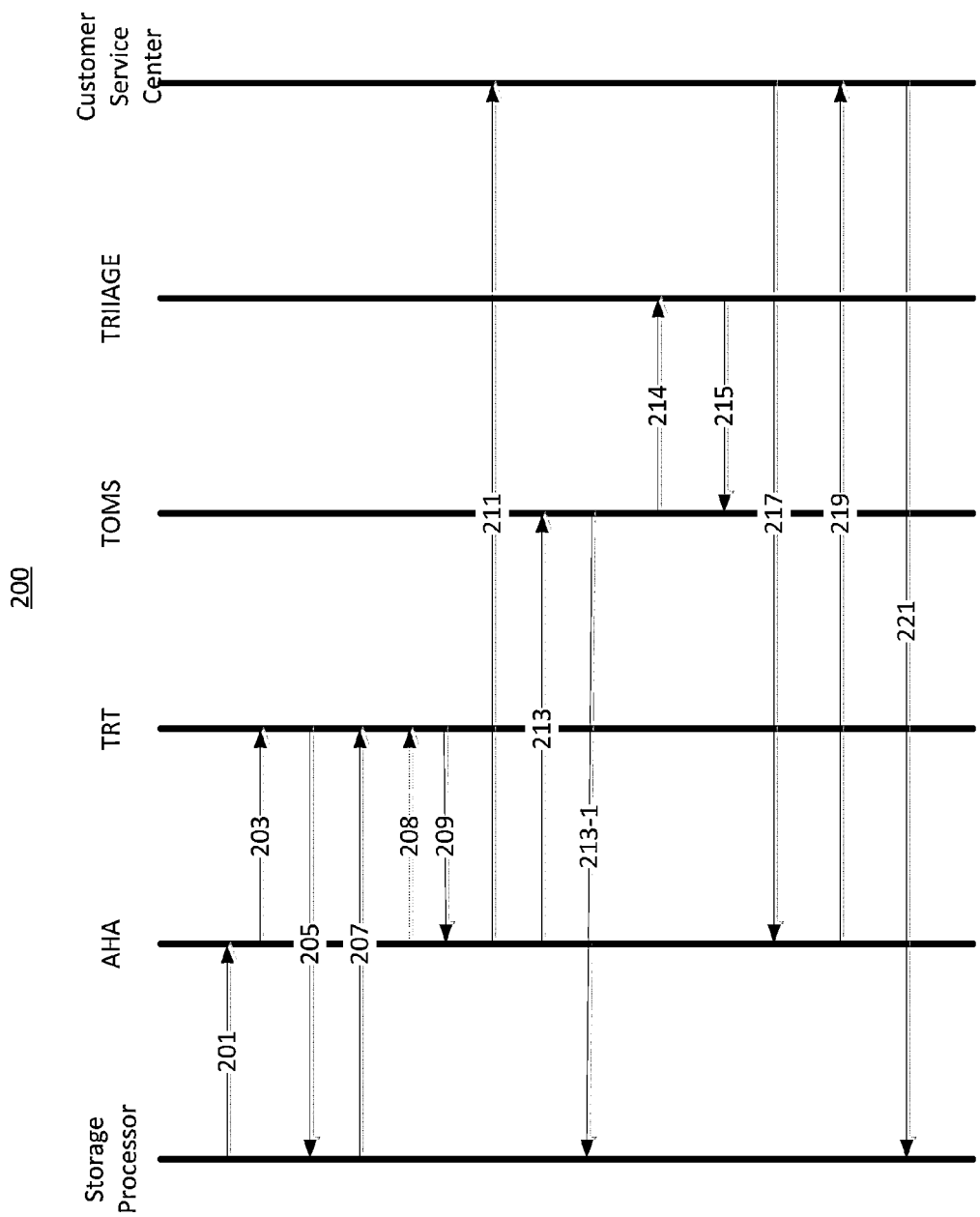
FIG. 2 is a flow diagram of the sequence taken by the Storage array, management station and customer service station.

The first step of the triage on management station module 107 will be to collect all the logs necessary to diagnose the error 125. These errors are collected and archived in for example disk 119. Once the collected information is archived, the collected information can be subjected to a suite of tests which analyze the log file searching for patterns of known errors. If the suite of tests that are part of triage on management station module 107 determine the root cause of the error the information used and the resolution are deposited in a triage file FIG. 2 is a flow diagram of the sequence 200 taken by the storage array, management station 103 and customer service station server 123 in response to an error 125. The error 125 is generated on storage array 101 and forwarded at 201 to the management station 103 where the array health analyzer 111 filters the error. As discussed above, some errors are benign or are throttled back depending on their type, severity or group. If the error 125 is not throttled back as it is considered valid, the array health analyzer 111 at 203 informs the triage in real time module 109 that an error exists. The triage in real time module 109 runs a series of scripts at 205 to diagnose and repair the error on the storage array. The result of the script running on the storage array is returned at 207 to the triage in real time module 109. However, if the triage in real time module 109 runs for longer than a predetermined period, then the array health analyzer 111 kills at 208 the real time module 109. The triage in real time module 109 returns to the array health analyzer 111 the status of the error 125 being processed in the form of an XML document 313.

The array health analyzer 111 determines if the scripts passed and if so, then the resulting XML document is archived. Otherwise, the array health analyzer 111 forwards at 211 the XML document 313 to the customer service center server 123. In parallel, the array health analyzer 111 has the triage on management station module 107 begin collecting at 213 logs required for a deep analysis of the error 125. Once the triage on management station module 107 completes collecting the logs they are archived in a zip file and the triage on management station module 107 begins a deep analysis of the log file. The triage on management station module 107 archives the result of the deep analysis of the logs files in a separate zip file. The triage on management station module 107 indicates 215 to the array health analyzer 111 that the analysis is complete.

The customer service center server 123 having previously been informed 211 of the error 125, requests 217 the archived zip files from the management station 103 which returns 219 the archived zip files. Support personnel at the customer service center 123 analyze the problem and form a solution or use the solution found in the triage zip file. The support personnel at the customer service center 123 initiate 221 repair of the disks 104 or other component in the storage array 101.

Figure 3:
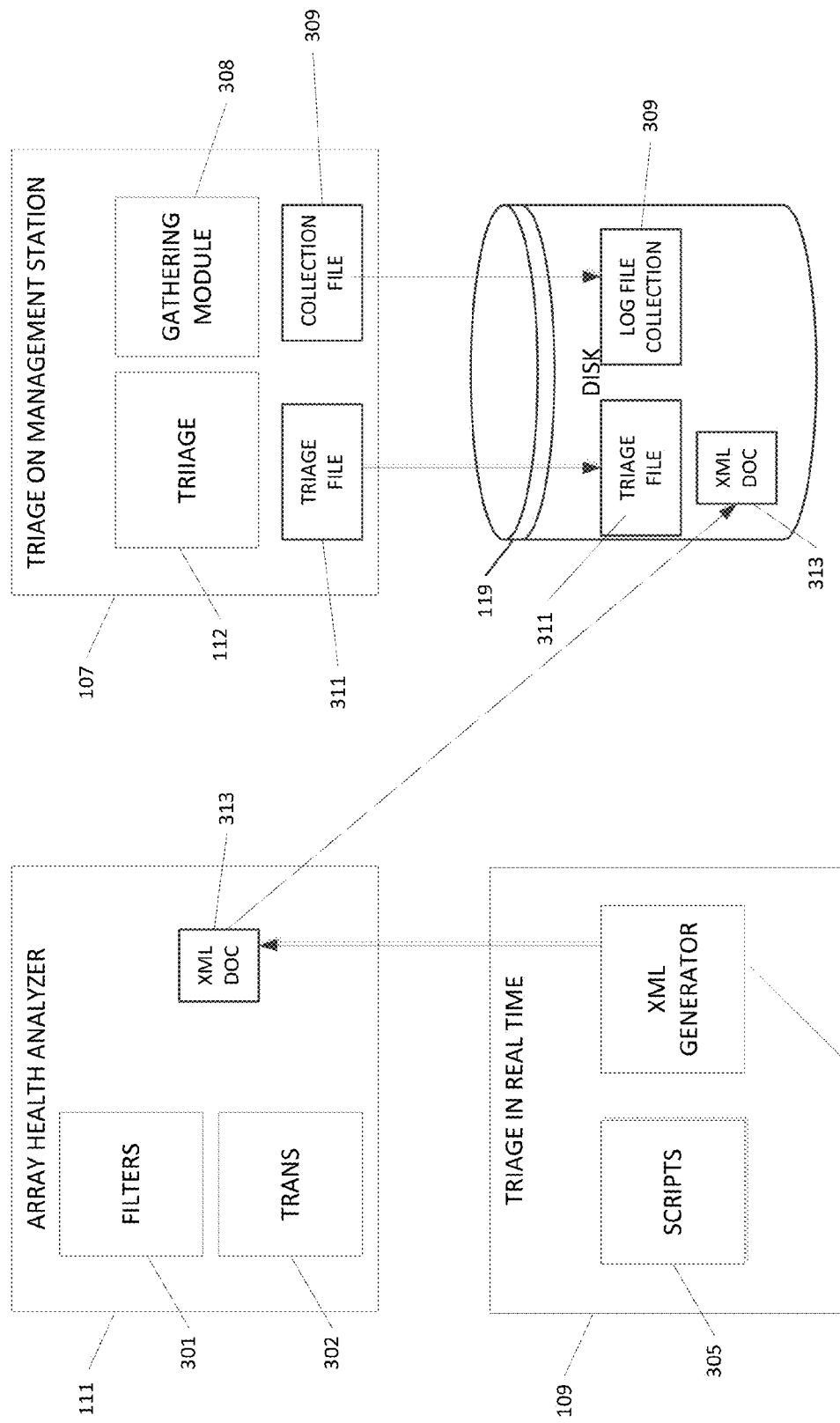
FIG. 3 is a graphic illustrating the software modules, data and storage found in the management station 101.

FIG. 3 is a graphic illustrating the software modules, data and storage found in the management station 103. The management station 103 as discussed above, executes the array health analyzer 111 which includes the filters 301 and a transmission module 302. The filters 301 reduce the amount of errors processed by the triage in real time module 109 and the triage on management station 107 by filtering out errors and reducing the number of errors processed by throttling back particular error codes, groups of error codes and error codes of different severities based on a predetermined number of times the error occurs in a predetermined time period.

Once the array health analyzer 111 filters out the benign and repetitive errors the triage in real time module 109 is executed. The triage in real time module 109 includes scripts 305 for performing triage on storage array 101. The scripts 305 check individual components or a series of components found in the storage array 101. When the scripts have completed execution, the XML generator 307 forms an XML document 313 that is forwarded back to the array health analyzer 111 indicating the status of the script execution. The array health analyzer 111 archives the XML document 313 on the disc 119. The array health analyzer 111 forwards via the transmission module 302 (i.e. dials home 127) the XML document 313 to the customer service center server 123 whether the scripts 305 passed or failed. Where the scripts 305 passed the customer service center server 123 only records the XML document 313. Where a failure of the scripts is recorded in the XML document 313, the customer service center server 123 records the document and marks the document for further processing.

The triage on management station module 107 is executed when the triage in real time module 109 completes or is killed by the array health analyzer 111. The triage management station module 107 includes a gathering module 308 for collecting the log files (not shown) from the storage array 101 necessary to determine the cause of the error 125 into a collection file 309. The collection file 309 is further stored on the disc 119 for later retrieval. The triage on management station module 107 includes analysis modules for analyzing the collection file 309 and determining the root cause of the error 125. The root cause and the information used to determine the root cause are stored in a triage file 311 that is also stored on the disc 119.

Figure 4:
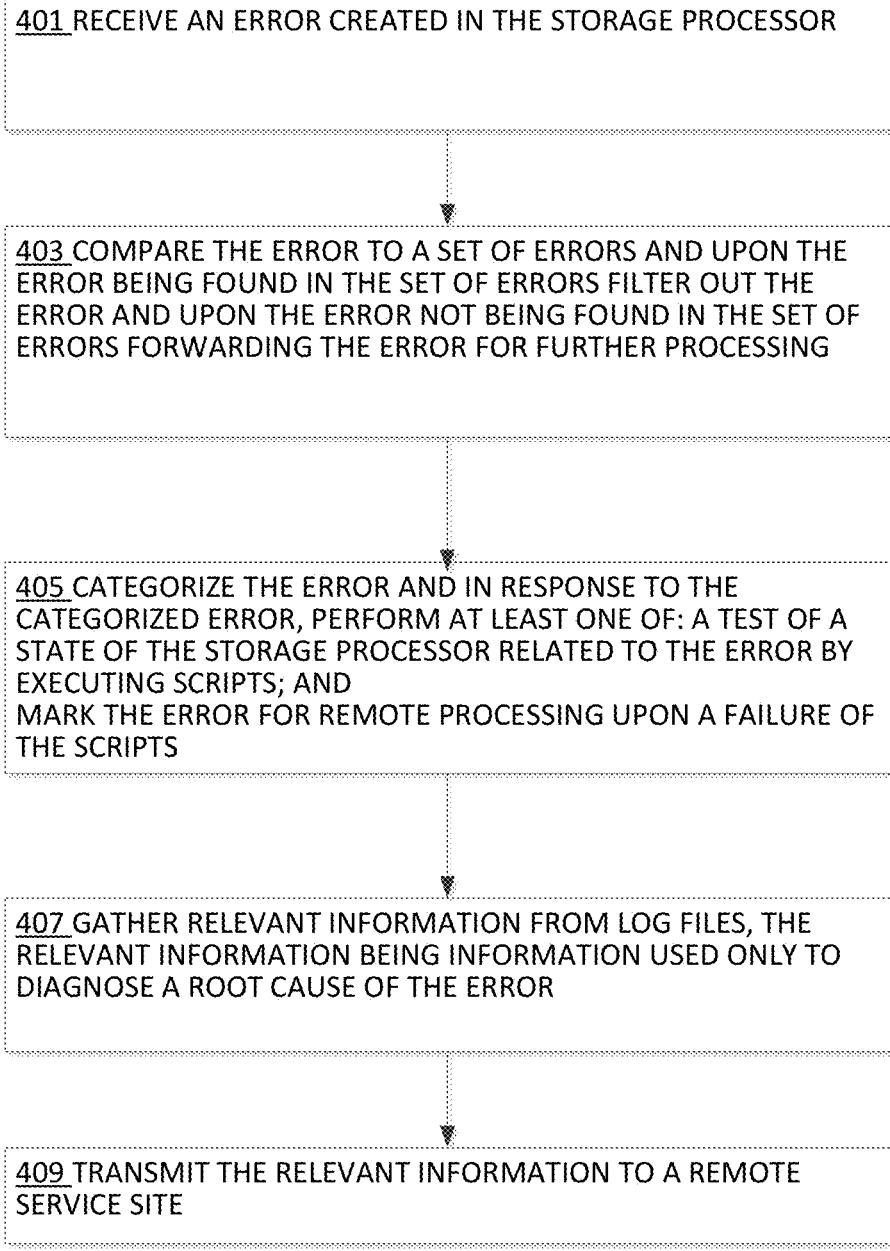
FIG. 4 is a flowchart illustrating a method of processing detected errors in a storage array.

FIG. 4 is a flowchart illustrating a method of processing detected errors in a storage array. In a first step, the management station 103 receives (401) an error 125 created in the storage array 101. Next the management station 103 compares (403) the error 125 to a set of errors in filter 301 and upon the error being found in the set of errors filter out the error 125 and upon the error 125 not being found in the set of errors in filter 301 forwarding the error 125 for further processing. Then the management station 103 categorizes (405) the error and in response to the categorized error, performs at least one of: testing the state of the storage array 101 related to the error 125 by operation of scripts 305; and marking the error (i.e. XML document 313) for remote processing upon a failure of the scripts 305. Next, the management station 103 gathers (407) relevant information from log files of the storage array 101, where the relevant information includes information used only to diagnose a root cause of the error. Lastly, the management station 103 transmits (409) the relevant information to a remote service site server 123.

While various embodiments of the present disclosure have been particularly shown and described, it will be understood by those skilled in the art that various changes in the form and details may be made therein without departing from the spirit and scope of the present disclosure as defined by the appended claims.

What is claimed is:

1. A system of processing detected errors in a storage array, the system comprising:
   a filter circuit configured and arranged to receive an error in the storage array and filter out the error upon the error being found in a set of filtered errors and forward the error upon the error not being found in the set of filtered errors;
   a triage circuit configured and arranged to receive from the filter circuit the forwarded error and categorize the error and in response to the categorized error, the triage circuit performs at least one of (1) resolves an error via execution of a test circuit; (2) repairs the error; and (3) marks the error for remote processing upon a failure of the test circuit;
   a data gathering circuit configured and arranged to receive from the filter circuit the error and gather relevant information from log files, the relevant information being information used only to diagnose a root cause of the error; and
   a transmission circuit configured and arranged to forward the error and the relevant information to a remote service site;
   wherein the triage circuit is configured and arranged to have access privileges to the storage array, and the data gathering circuit is configured and arranged to have access to the log files of the storage array.

2. The system according to claim 1, wherein the triage circuit is further configured and arranged to:
   test a component of the storage array and produce a result of the test.

3. The system according to claim 2, wherein the triage circuit is further configured and arranged to:
   create a document indicating the result of the test performed by the triage circuit; and
   provide the document to the transmission circuit.

4. The system according to claim 1, wherein the data gathering circuit is further configured and arranged to:
   store the gathered relevant information;
   analyze patterns in the gathered relevant information and indicate steps required to repair the error; and
   store the indicate steps required to repair the error for retrieval.

5. A method for processing detected errors in a storage array, the method comprising:
   receiving an error created in the storage array;
   comparing the error to a set of errors and upon the error being found in the set of errors filter out the error and upon the error not being found in the set of errors forwarding the error for further processing;
   categorizing the error and in response to the categorized error, perform at least one of:
      i.) testing the state of the storage array related to the error by executing scripts, and
      ii.) marking the error for remote processing upon a failure of the scripts;
   gathering relevant information from log files, the relevant information being information used only to diagnose a root cause of the error; and
   transmitting the relevant information to a remote service site;
   wherein categorizing the error includes access privileges for accessing the storage array, and gathering relevant information includes accessing log files of the storage array.

6. The method according to claim 5, wherein testing the state of the storage array includes:
   running the script targeting a component indicated by the error to produce a result.

7. The method according to claim 6, wherein the categorizing the error further includes:
   creating a document indicating the result of the test performed by running the scripts; and
   storing the document.

8. The method according to claim 5, wherein gathering relevant information further includes:
   storing the gathered relevant information;
   analyzing patterns in the gathered relevant information and indicating steps required to repair the error; and
   storing the indicate steps required to repair the error for retrieval.

9. A non-transitory computer readable storage medium with a computer programmed stored thereon, the computer program executed by a processor to perform a method for processing detected errors in a storage array, the method comprising:
   receiving an error created in the storage array;
   comparing the error to a set of errors and upon the error being found in the set of errors filter out the error and upon the error not being found in the set of errors forwarding the error for further processing;
   categorizing the error and in response to the categorized error, perform at least one of:
      i.) testing the state of the storage array related to the error by executing scripts, and
      ii.) marking the error for remote processing upon a failure of the scripts;
   gathering relevant information from log files, the relevant information being information used only to diagnose a root cause of the error; and
   transmitting the relevant information to a remote service site;
   wherein categorizing the error includes access privileges for accessing the storage array, and gathering relevant information includes accessing log files of the storage array.

10. The non-transitory computer readable storage medium according to claim 9, wherein testing the state of the storage array includes:
    running the script targeting a component indicated by the error to produce a result.

11. The method according to claim 10, wherein the categorizing the error further includes:
    creating a document indicating the result of the test performed by running the scripts; and
    storing the document.

12. The method according to claim 9, wherein gathering relevant information further includes:
    storing the gathered relevant information;
    analyzing patterns in the gathered relevant information and indicating steps required to repair the error; and
    storing the indicate steps required to repair the error for retrieval.

* * * * *